Oct. 16, 1934.  L. V. RICE ET AL  1,977,245
CORSET
Filed Sept. 6, 1933  8 Sheets-Sheet 1

Fig. 1

Witness
H. Woodard

Inventors
Lula V. Rice
Joel A. Rice

By H. R. Wilson & Co.
Attorneys.

Oct. 16, 1934.  L. V. RICE ET AL  1,977,245
CORSET
Filed Sept. 6, 1933  8 Sheets-Sheet 4

Witness
H. Woodard

Inventors
Lula V. Rice
Joel A. Rice
By H. B. Willson & Co.
Attorneys.

Oct. 16, 1934.  L. V. RICE ET AL  1,977,245
CORSET
Filed Sept. 6, 1933   8 Sheets-Sheet 5

Inventors
Lula V. Rice
Joel A. Rice
By H. B. Wilson & Co.
Attorneys.

Witnesses
H. Woodard

Patented Oct. 16, 1934

1,977,245

UNITED STATES PATENT OFFICE 1,977,245

CORSET

Lula V. Rice and Joel A. Rice, New York, N. Y.

Application September 6, 1933, Serial No. 688,370

8 Claims. (Cl. 2—26)

The invention relates to an improved corset, corselette or the like (hereinafter termed a corset), and it aims to provide novel means to hold the corset down in proper position and at the same time to hold the upper thighs against chafing contact with each other. Both of these functions are attained by means of wide thigh-encircling bands attached to the corset, and these bands absolutely cure and/or prevent chafing, they will not allow the corset to ride up, and the hips and thighs will be reduced by holding them in. Objects of the invention are to provide for any necessary adjustments for accurate fitting and comfort, and to provide for easily releasing the front ends of the bands so that the latter may be disengaged from the thighs and moved aside when required.

A still further aim is to provide for entire removal of the thigh bands whenever advisable, for washing or other sanitary purposes.

With the foregoing in view, the invention resides in the novel subject matter hereinafter described and claimed, description being accomplished by reference to the accompanying drawings.

Fig. 3 is a plan view of the form of corset shown in Figs. 1 and 2 spread into flat form.

Fig. 6 is a plan view showing the corset of Figs. 4 and 5 spread into flat form.

In constructing the corset, any appropriate corset fabrics, elastics, reinforcements, bindings, clasps, etc. may be utilized, and relatively elastic and inelastic portions may be located wherever the skill of the corsetière may dictate for figure shaping, strength, flexibility, comfort, etc. The corset may be divided at any convenient place or places to facilitate application and removal, may be constructed with or without brassière portions, may have any desired design, etc. and it is therefore to be understood that the present disclosure is illustrative in such regard rather than limiting.

Figure 1:
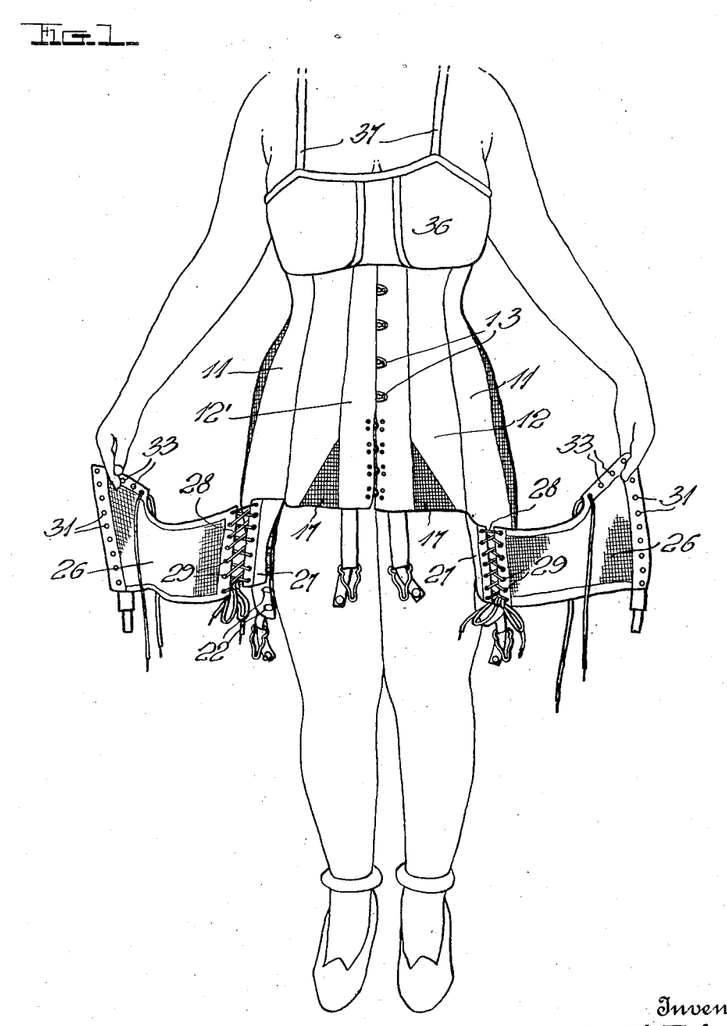
Fig. 1 is a front elevation of one form of the corset applied, the thigh bands being detached at their rear ends and held aside.
Figure 2:
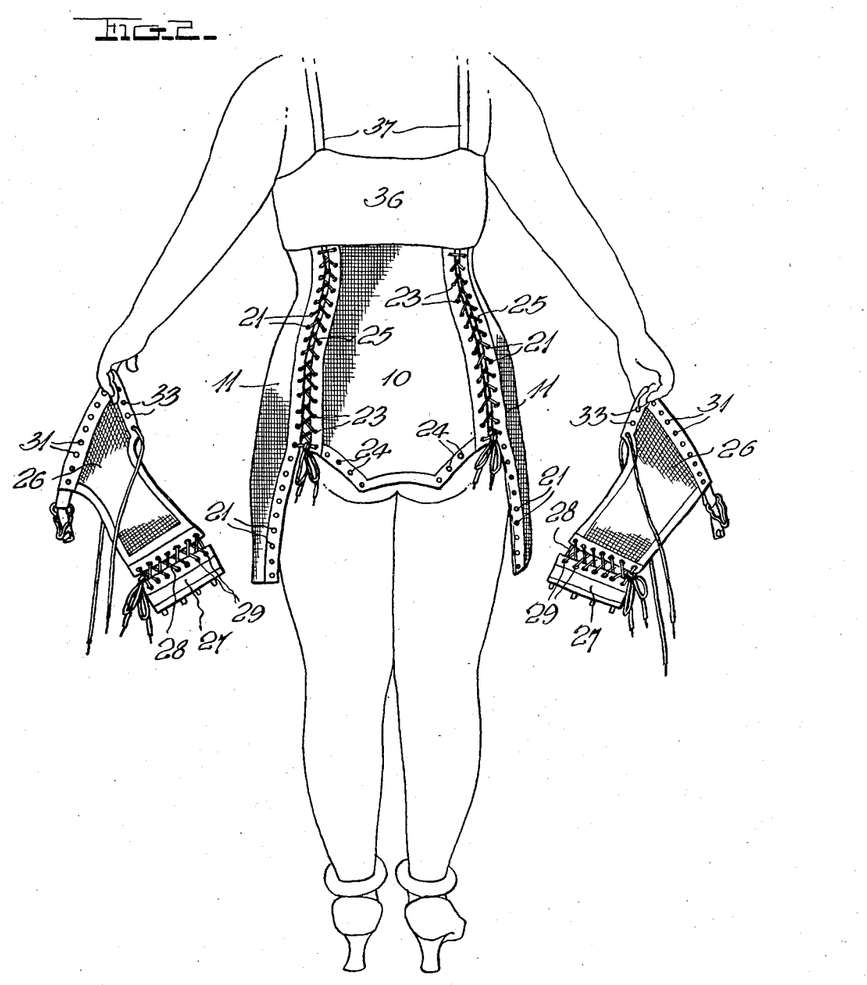
Fig. 2 is a rear elevation of the same form of corset showing the thigh bands entirely removed.

In Figs. 1 to 3, the back of the corset is denoted at 10, the sides at 11, and the front by 12—12′, said front being formed from two halves connectible throughout the greater part of their height by a clasp having co-acting studs 13 and eyes 14, the lower end portions of said halves being connectible by co-acting eyes 15 and hooks 16.

The front halves 12 and 12′ are preferably formed for the greater part from suitable cloth and are provided with one-way elastic inserts 17. These halves are stitched or otherwise connected with the front edges of the sides 11, and each of these sides is preferably composed of a cloth portion 18 and a one-way elastic portion 19. The back 10 which is connected with the rear edges of the sides 11, as hereinafter described, is by preferance formed from two-way elastic.

The sides 11 are provided with integral downwardly projecting portions 20 which project downwardly below the front 12—12′ and the back 10, to cover the outer sides of the upper thighs. Throughout the length of their rear edges, the sides 11 are provided with vertical rows of eyelets 21, and the front edges of the downwardly projecting portions 20 are provided with vertical rows of eyes 22.

The back 10 is of a length to substantially cover the buttocks and is provides along its vertical edges with rows of eyelets 23. The lower edge of the back 10 is provided along its end portions with substantially horizontal rows of eyelets 24. Lacings 25 connect the eyelets 23 with the eyelets 21 of the sides 11, but these laces do not engage the eyelets 21 carried by the downwardly projecting portions 20 of said sides.

Two thigh bands 26 are provided to cover the fronts, inner sides and backs of the upper thighs. These thigh bands are for the most part formed from two-way elastic, but they are provided with short front end portions 27 formed of cloth, these portions being connected to the elastic portions by lacings 28 and eyes 29. The cloth portions 27 are provided with hooks 30 for detachable engagement with the eyes 22 on the front edges of the downwardly projecting portions 20 of the corset sides 11.

Along their vertical rear edges, the thigh bands 26 are provided with rows of eyelets 31 which are disposed adjacent the eyelets 21 carried by the rear edges of the downwardly projecting side portions 20, but these eyelets of the side portions out-number the eyelets 31 with which they are connected by lacings 32, allowing the thigh bands 26 to be vertically adjusted to most comfortably position them. In this connection, it will be observed that the eyes 22 out-number the hooks 30 for the same purpose. Adjustment of the thigh bands as to length, is permitted by the lacings 28.

The rear end portions of the upper edges of the thigh bands 26 are provided with eyelets 33 disposed under the eyelets 24 of the back 10, said eyelets 33 and 24 being connected by lacings 34 which obviously may be adjusted when the bands 26 are raised or lowered.

Not only do the leg bands 26 and the co-acting portions 20 of the sides 11, hold the upper portions of the thighs against chafing contact with each other, but they hold the corset properly down in position upon the hips and buttocks, so that the figure will be well confined and smoothly shaped. Whenever necessary, the bands 26 may be unhooked at their front ends and held aside. Then too, as seen in Fig. 2, they may be entirely detached for washing, sanitary purposes, etc. In Fig. 1, the bands 26 have not been unhooked at their front ends and they are being held aside in positions which they will probably never occupy during use of the corset, for illustrative purposes only.

Not only do the lacings 32 connect the thigh bands 26 with the portions 20 of the sides 11, but they afford further adjustment for the length of said bands, and the lacings 25 provide also for advisable adjustments to fit the corset to the figure.

Figure 4:
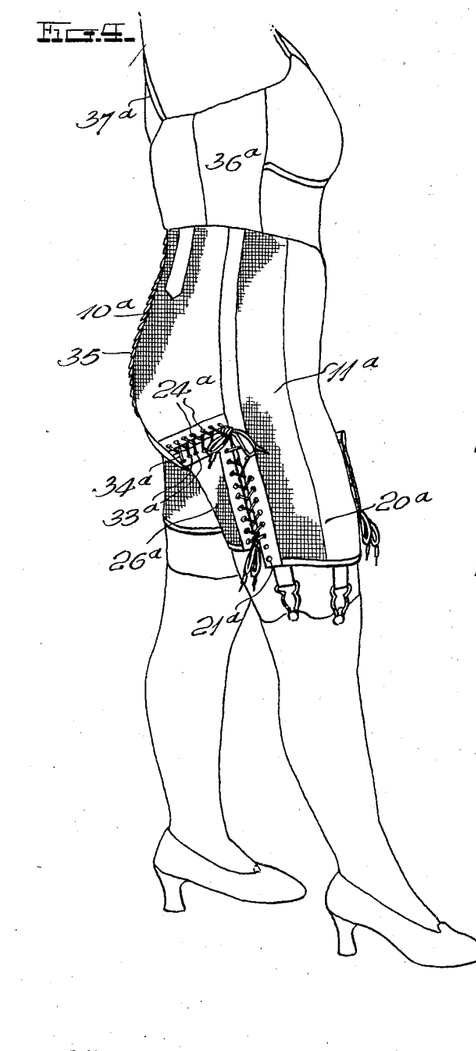
Fig. 4 is a side elevation showing a different form of corset applied.
Figure 5:
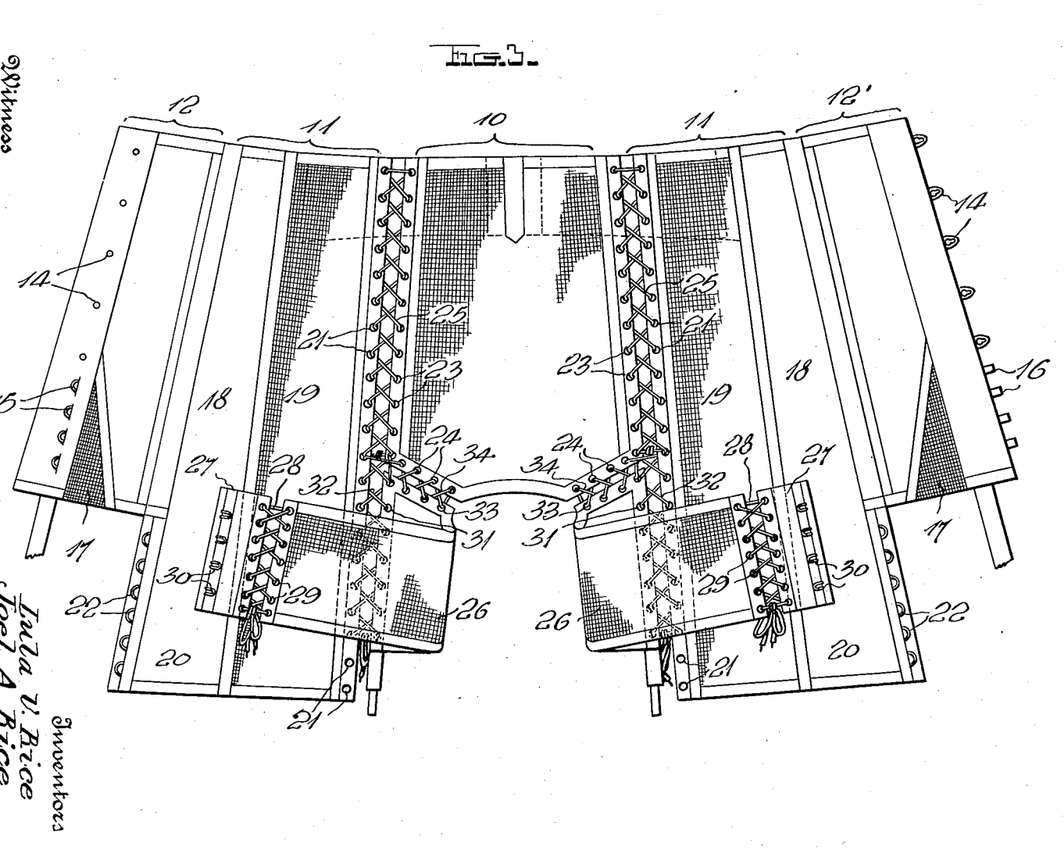
Fig. 5 is a rear elevation showing the corset shown in Fig. 4.

In Figs. 4, 5 and 6, the corset back $10^a$ is centrally laced as at 35, the sides $11^a$ are suitably connected with this back, and the two halves $12^a$ of the corset front are similarly connected with said sides. These sides are provided with downwardly projecting portions $20^a$ whose rear edges are provided with vertical rows of eyelets $21^a$ and whose front edges are provided with eyes $22^a$. The meeting edges of the front halves $12^a$ may be connected by co-acting fasteners $13^a$, $14^a$, $15^a$ and $16^a$, as above described.

Along the end portions of its lower edge, the corset back $10^a$ is provided with rows of eyelets $24^a$ which are connected by lacings $34^a$ with eyelets $33^a$ of the leg bands $26^a$, said eyelets being located along the rear end portions of the upper edges of said bands. The vertical rear edges of these bands are provided also with eyelets $31^a$ which are less in number than the eyelets $21^a$, these two sets of eyelets being connected by lacings $32^a$. The lacings $32^a$ and $34^a$ perform the same functions as the lacings 32 and 34, with regard to adjusting the thigh bands $26^a$. These bands may be considered as identical with the bands 26 and they are provided on their front ends with hooks $30^a$ which may be quickly engaged with or disengaged from the eyes $22^a$. These eyes exceed the hooks in number, allowing vertical adjustment of the bands $26^a$.

The brassière 36 with its shoulder straps 37 shown in Figs. 1 and 2 are not parts of the corset illustrated in those views. The same is true of the brassière $36^a$ and the shoulder straps $37^a$ shown in Figs. 4 and 5. The corset however may be provided with an attached brassière portion as shown in Figs. 7, 8 and 9, said portion being denoted at $36^b$ and having shoulder straps $37^b$.

Figure 7:
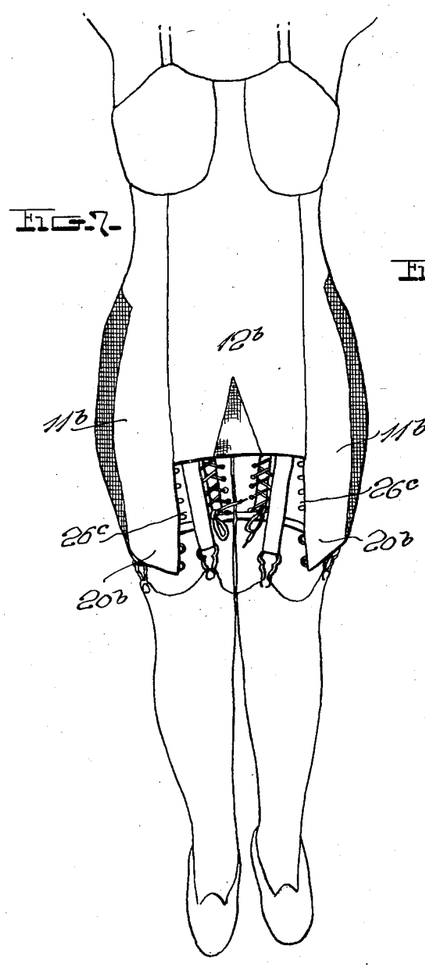
Fig. 7 is a front elevation showing a third form of corset.
Figure 8:
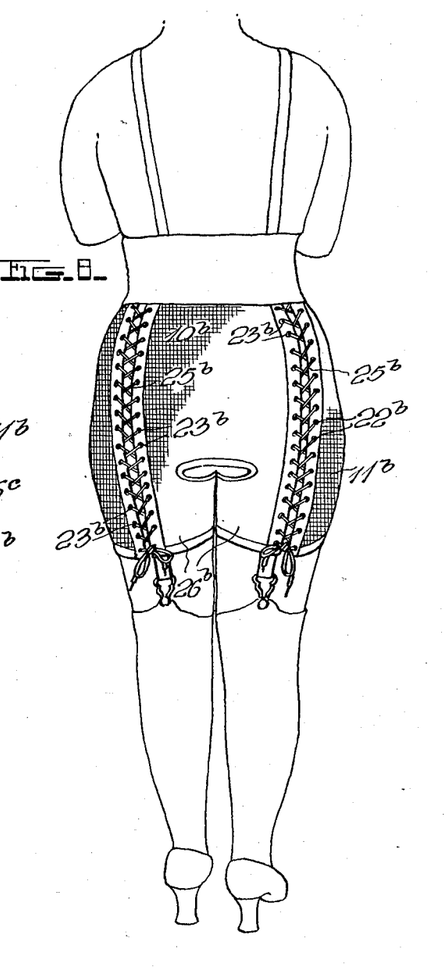
Fig. 8 is a rear elevation showing the corset shown in Fig. 7.
Figure 9:
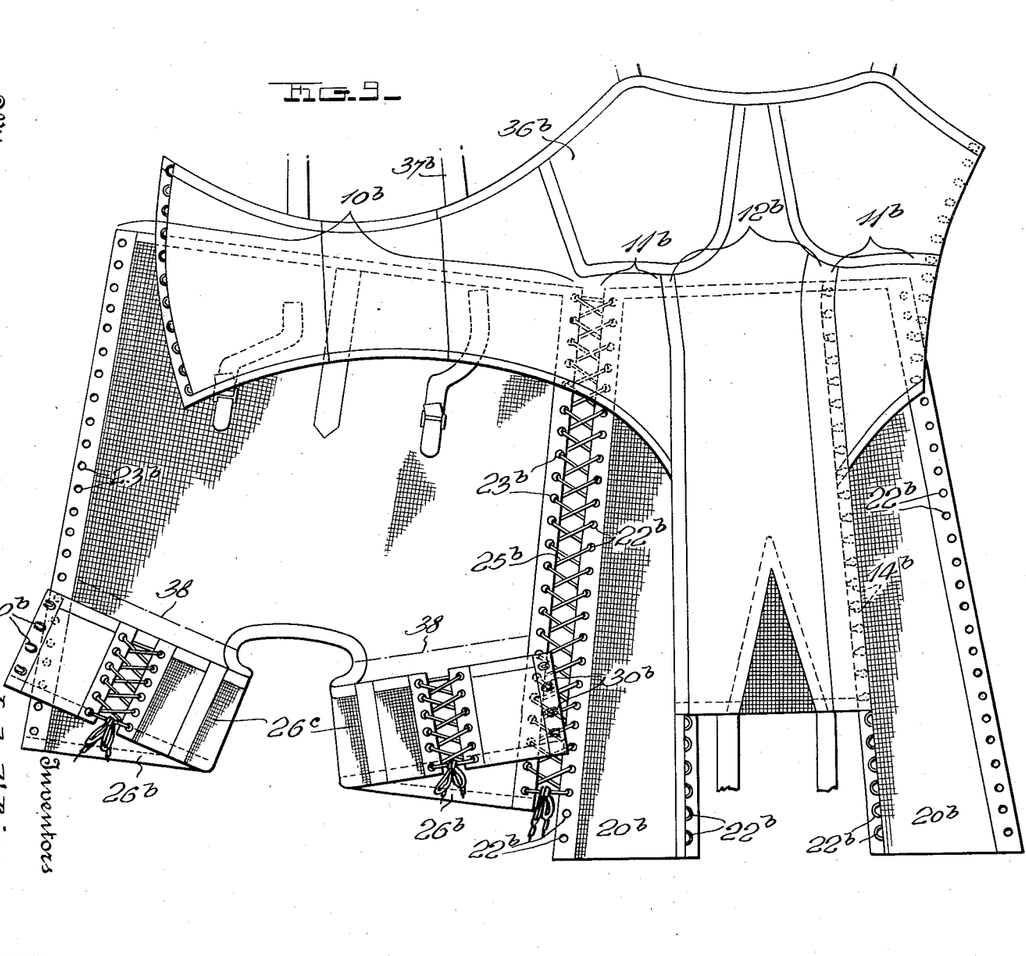
Fig. 9 is a plan view showing the same form of corset as in Figs. 7 and 8 spread into flat form.

In Figs. 7, 8 and 9, the corset back is shown at $10^b$, the sides at $11^b$ and the front at $12^b$. The sides $11^b$ are provided with integral lower portions $20^b$ projecting downwardly below the front $12^b$ and below the back $10^b$. For descriptive purposes, two dot and dash lines 38 have been placed on this corset back and they may be considered as defining portions of the lower end of said back, the subjacent portions $26^b$ being parts of thigh bands $26^c$ integrally joined to said back along said lines 38.

From its upper end, to the lower edges of the thigh bands $26^c$, the back portion of the corset is provided with vertical rows of eyelets $23^b$, and the rear edges of the sides $11^b$ are provided with similar rows of eyelets $22^b$. Lacings $25^b$ connect these eyelets, thereby connecting the back $10^b$ and the rear ends of the thigh bands $26^c$ to the corset sides $11^b$. It will be observed that the eyelets $22^b$ exceed in number, the eyelets $23^b$. Thus, the back $10^b$ and the thigh bands $26^c$ may be vertically adjusted as a unit, in this form of the invention.

Aside from their integral connections with the corset back $10^b$, the thigh bands $26^c$ correspond to the bands 26 and $26^a$ above described, and the hooks $30^b$ on the front ends of these bands are engageable with eyes $22^b$ on the front edges of the downwardly projecting portions $20^b$ of the sides $11^b$. There are less of the hooks $30^b$ than there are eye $22^b$, allowing vertical adjustment of the front ends of the thigh bands $26^c$.

The corset shown in Figs. 7, 8 and 9 is not centrally fastened in the front, but appropriate co-acting fasteners $14^b$ are provided for connecting one edge of the corset front $12^b$ with one of the corset sides $11^b$, the other of these sides being stitched or otherwise connected with said front.

Figures 10, 11:
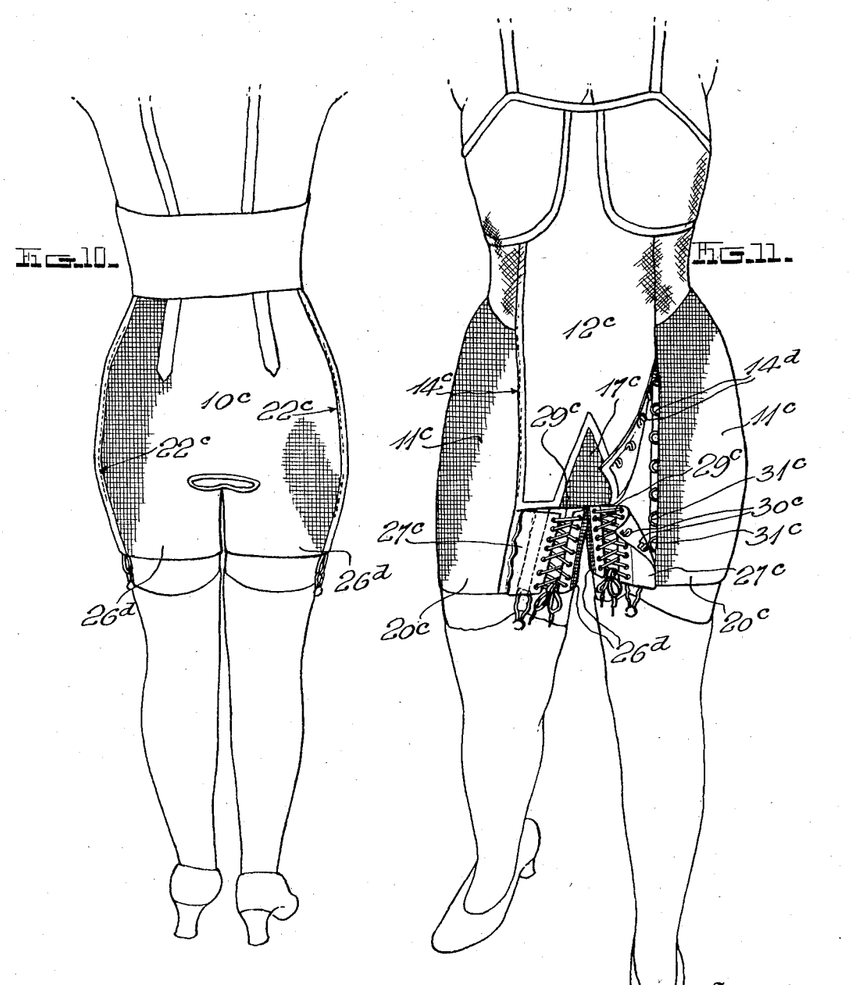
Figs. 10 and 11 are respectively a rear elevation and a front perspective showing a fourth form of construction.

In Figs. 10 and 11, a "made-to-order" corset has been shown, in which a number of the adjustments above described have been omitted, such adjustments however being necessary in so-called "stock numbers" which must be readily adjustable to fit different figures. In these views, the corset front is denoted at $12^c$, the sides at $11^c$ and the back at $10^c$. The back $10^c$ and the thigh bands $26^d$ are integral with each other and stitched along the lines $22^c$ to the rear edges of the sides $11^c$. One of these sides is stitched at $14^c$ to the front $12^c$ and the other of said sides is detachably connected with said front by suitable clasps or other fasteners $14^d$. The back $10^c$, sides $11^c$ and thigh bands $26^d$ are formed from one-way or two-way elastic and the front $12^c$ is of cloth with an elastic insert $17^c$ at its lower end. The front terminals $27^c$ of the thigh bands $26^d$ are inelastic and are adjustably laced on as seen at $29^c$. These terminals are provided with hooks $30^c$ to engage eyes $31^c$ on the front edges of the downwardly projecting side portions $20^c$.

It will be seen from the foregoing that novel and advantageous provision has been made for carrying out the objects of the invention, and it is to be understood that the latter may be carried out in forms other than those herein disclosed, the disclosure being illustrative rather than limiting in a number of respects.

What is claimed is:—

1. A corset comprising a front, a back extending downwardly sufficiently to substantially cover the buttocks, sides having portions projecting downwardly below said front and back to cover the outer sides of the upper thighs, thigh bands to cover the fronts, inner sides and backs of the upper thighs, lacings connecting the rear ends of said thigh bands with the rear edges of said downwardly projecting portions of said sides, the rear end portions of the upper edges of said thigh bands being connected with the lower end of said back to hold the latter down tightly against the buttocks, the remainders of said upper edges being free, and quick-releasable means for connecting the front ends of said thigh bands with the front edges of said downwardly projecting portions of said sides.

2. A corset comprising a front, sides connected with said front and having portions projecting downwardly beyond the same to cover the outer sides of the upper thighs, said sides and said downwardly projecting portions thereof having vertical rear edges in continuity with each other, said sides being provided with rows of eyelets along said edges from the upper ends of said sides to the lower ends of said downwardly projecting portions thereof, a back extending downwardly sufficiently to substantially cover the buttocks, thigh bands to cover the fronts, inner sides and backs of the upper thighs, the rear end portions of said thigh bands being disposed under and connected with said back, said back and said rear ends of said thigh bands having vertical edges provided with rows of eyelets, lacings connecting these eyelets with those of said sides and their downwardly projecting portions, and releasable means for connecting the front ends of said thigh bands with the front edges of said downwardly projecting portions.

3. A corset comprising a front, a back extending downwardly sufficiently to substantially cover the buttocks, sides having portions projecting downwardly below said front and back to cover the outer sides of the upper thighs, thigh bands to cover the fronts, inner sides and backs of the upper thighs, lacings connecting the rear ends of said thigh bands with the rear edges of said downwardly projecting portions of said sides, additional lacings connecting the rear portions of the upper edges of said thigh bands with the lower end of said back to hold the latter down tight against the buttocks, the remainders of said upper edges being free, and releasable means for connecting the front ends of said thigh bands with the front edges of said downwardly projecting portions of said sides.

4. A corset comprising a front, a back extending downwardly sufficiently to substantially cover the buttocks, said back having vertical rows of eyelets from the upper to the lower ends of its vertical edges, said back being also provided with short substantially horizontal rows of eyelets along the end portions of its lower edge, sides connected with said front and having portions projecting downwardly below said front and back to cover the outer sides of the upper thighs, the rear edges of said sides being provided with vertical rows of eyelets from their upper ends to the lower ends of said downwardly projecting portions, lacings engaged with the vertical rows of eyelets of said back and with the eyelets of said sides exclusive of those carried by said downwardly projecting portions, thigh bands to cover the fronts, inner sides and backs of the upper thighs, said thigh bands being provided with vertical rows of eyelets at their rear ends and with substantially horizontal rows of eyelets along the rear end portions of their upper edges, lacings engaged with said vertical rows of eyelets of said thigh bands and with the eyelets carried by said downwardly projecting portions of said sides, lacings engaged with the eyelets of the lower edge of said back and with those of the upper edges of said thigh bands, and releasable fastening means connecting the front ends of said thigh bands with the front edges of said downwardly projecting portions of said sides.

5. A corset comprising a front, a back extending downwardly sufficiently to substantially cover the buttocks, said back having vertical edges, thigh bands to cover the fronts, inner sides and backs of the upper thighs, said thigh bands being integrally jointed to the lower end of said back along the rear end portions of their upper edges and having vertical rear edges in continuity with said vertical edges of said back, said back and thigh bands having vertical rows of eyelets along said vertical edges thereof, sides connected with said front and having portions projecting downwardly below said front and back to cover the outer sides of the upper thighs, said sides and said downwardly projecting portions having vertical edges in continuity, said sides having vertical rows of eyelets from the upper to the lower ends of said vertical edges thereof, lacings engaged with these eyelets and with those of said back and said thigh bands, and releasable means for connecting the front ends of said thigh bands with the front edges of said downwardly projecting portions of said sides.

6. A corset comprising a front, a centrally laced back extending downwardly sufficiently to substantially cover the buttocks, the end portions of the lower edges of said back having substantially horizontal rows of eyelets, sides having portions projecting downwardly below said front and back to cover the outer sides of the upper thighs, the rear edges of said downwardly projecting portions having vertical rows of eyelets, thigh bands to cover the fronts, inner sides and backs of the upper thighs, the rear ends of said thigh bands having vertical rows of eyelets and the rear end portions of the upper edges of said thigh bands being provided with substantially horizontal rows of eyelets, lacings connecting the eyelets of said rear ends of said thigh bands with those of said rear edges of said downwardly projecting portions of said sides, additional lacings connecting said eyelets of said lower edge of said back with said eyelets of said upper edges of said thigh bands, and releasable means for connecting the front ends of said thigh bands with the front edges of said downwardly projecting portions of said sides.

7. A corset comprising an inelastic front having substantially vertical edges, two elastic sides extending rearwardly from said front and both projecting downwardly from said front, said sides having substantially vertical front and rear edges, the vertical front edge of one of said sides being stitched to one of said vertical edges of said front, fasteners for connecting the front edge of the other of said sides with the other vertical edge of said front, a one-piece elastic back having substantially vertical edges connected to said rear edges of said sides, said one-piece elastic back having integral thigh bands to extend forwardly between the thighs, and releasable means for connecting the front ends of said thigh bands with the front edges of said downwardly projecting portions of said elastic sides.

8. A corset comprising an inelastic front having substantially vertical edges, two elastic sides extending rearwardly from said front and both projecting downwardly from said front, said sides having substantially vertical front and rear edges, the vertical front edge of one of said sides being stitched to one of said vertical edges of said front, fasteners for connecting the front edge of the other of said sides with the other vertical edge of said front, a one-piece elastic back having substantially vertical edges connected to said rear edges of said sides, said one-piece back having integral thigh bands to extend forwardly between the thighs, adjustable terminals laced to the front ends of said thigh bands, and fasteners for detachably connecting said terminals with the front edges of said downwardly projecting portions of said elastic sides.

LULA V. RICE.
JOEL A. RICE.